US008789105B2

(12) United States Patent
Filippov et al.

(10) Patent No.: US 8,789,105 B2
(45) Date of Patent: Jul. 22, 2014

(54) METHODS AND APPARATUS FOR DELIVERING CONTENT FROM A TELEVISION CHANNEL

(75) Inventors: Vasily B. Filippov, Saint-Petersburg (RU); Yaroslav N. Goncharov, Saint-Petersburg (RU)

(73) Assignee: MobiWorldMedia, Hackensack, NJ (US)

( * ) Notice: Subject to any disclaimer, the term of this patent is extended or adjusted under 35 U.S.C. 154(b) by 1448 days.

(21) Appl. No.: 12/196,849

(22) Filed: Aug. 22, 2008

(65) Prior Publication Data

US 2010/0306801 A1 Dec. 2, 2010

(51) Int. Cl.
*G06F 3/00* (2006.01)
*G06F 13/00* (2006.01)
*H04N 5/445* (2011.01)
*H04N 7/173* (2011.01)
*G06F 3/048* (2013.01)
*G06F 3/14* (2006.01)

(52) U.S. Cl.
USPC .......................................................... 725/44

(58) Field of Classification Search
CPC ............... H04N 1/234309; H04N 21/234336; H04N 21/440236; H04N 21/462; H04N 21/4621; H04N 21/472; H04N 21/8153; H04N 21/6131; H04N 21/6181; H04N 21/63

USPC ............ 715/838, 864; 725/37–39, 44, 62, 86, 725/105–106, 114, 127
See application file for complete search history.

(56) References Cited

U.S. PATENT DOCUMENTS

| | | | | |
|---|---|---|---|---|
| 2006/0041915 A1* | 2/2006 | Dimitrova et al. | | 725/81 |
| 2007/0250896 A1* | 10/2007 | Parker et al. | | 725/135 |
| 2007/0266403 A1* | 11/2007 | Ou et al. | | 725/46 |
| 2008/0201386 A1* | 8/2008 | Maharajh et al. | | 707/201 |
| 2009/0129740 A1* | 5/2009 | O'brien et al. | | 386/52 |
| 2009/0210903 A1* | 8/2009 | White | | 725/39 |

* cited by examiner

*Primary Examiner* — Hai V Tran
(74) *Attorney, Agent, or Firm* — Chapin IP Law, LLC

(57) ABSTRACT

A system receives a plurality of streaming videos from a plurality of providers of television channels. Each television channel provider delivers a respective streaming video. The television channel content delivering process creates a thumbnail image representation of the content for each of the streaming videos of each television channel. The thumbnail image representation is a sill picture taken from the video stream. The television channel content delivering process then transmits the thumbnail image representation to a device capable of rendering the thumbnail image representation, and renders the thumbnail image representation on the device. The thumbnail image is representation temporarily rendered in place of the streaming video.

20 Claims, 15 Drawing Sheets

204 RECEIVE A PLURALITY OF STREAMING VIDEOS FROM A PLURALITY OF PROVIDERS OF TELEVISION CHANNELS, EACH TELEVISION CHANNEL PROVIDER DELIVERING A RESPECTIVE STREAMING VIDEO

205 IDENTIFY PROVIDERS OF TELEVISION CHANNELS FROM WHICH TO OBTAIN THE PLURALITY OF STREAMING VIDEOS BASED ON A PREDETERMINED LIST OF PROVIDERS OF TELEVISION CHANNELS

OR

206 COMPILE A LIST OF PROVIDERS OF TELEVISION CHANNELS BASED ON PREVIOUSLY VIEWED STREAMING VIDEOS RENDERED ON A DEVICE CAPABLE OF RENDERING THE THUMBNAIL IMAGE REPRESENTATION, THE PREVIOUSLY VIEWED STREAMING VIDEOS SELECTED, BY A USER, FOR RENDERING ON THE DEVICE

OR

207 RECEIVE A SELECTION, BY A USER, IDENTIFYING PROVIDERS OF TELEVISION CHANNELS FROM WHICH TO OBTAIN THE PLURALITY OF STREAMING

*FIG. 7*

212 CREATE A THUMBNAIL IMAGE REPRESENTATION OF THE CONTENT FOR EACH OF THE STREAMING VIDEOS OF EACH TELEVISION CHANNEL

213 UPDATE THE THUMBNAIL IMAGE REPRESENTATION TO CAPTURE A CURRENT REPRESENTATION OF THE CONTENT OF THE STREAMING VIDEO

*FIG. 9*

214 TRANSMIT THE THUMBNAIL IMAGE REPRESENTATION TO A DEVICE CAPABLE OF RENDERING THE THUMBNAIL IMAGE REPRESENTATION

215 RECEIVE NOTIFICATION THAT AN UPDATED THUMBNAIL IMAGE REPRESENTATION HAS BEEN CREATED, THE UPDATED THUMBNAIL IMAGE REPRESENTATION CAPTURING A CURRENT REPRESENTATION OF THE CONTENT OF THE STREAMING VIDEO

216 TRANSMIT THE UPDATED THUMBNAIL IMAGE REPRESENTATION TO THE DEVICE CAPABLE OF RENDERING THE THUMBNAIL IMAGE REPRESENTATION

OR

217 RECEIVE A REQUEST, FROM THE DEVICE, FOR THE THUMBNAIL IMAGE REPRESENTATION

218 TRANSMIT THE THUMBNAIL IMAGE REPRESENTATION IN RESPONSE TO THE REQUEST

*FIG. 10*

```
┌─────────────────────────────────────────────────────────────────────┐
│ 222 RENDER THE THUMBNAIL IMAGE REPRESENTATION ON THE DEVICE, THE    │
│ THUMBNAIL IMAGE REPRESENTATION TEMPORARILY RENDERED IN PLACE OF     │
│ THE STREAMING VIDEO                                                 │
│                                                                     │
│     ┌───────────────────────────────────────────────────────────┐   │
│     │ 223 RENDER THE THUMBNAIL IMAGE REPRESENTATION OF A FIRST  │   │
│     │ TELEVISION CHANNEL CONCURRENTLY WITH STREAMING VIDEO OF A │   │
│     │ SECOND TELEVISION CHANNEL                                 │   │
│     └───────────────────────────────────────────────────────────┘   │
│                                  │                                  │
│                                  ▼                                  │
│     ┌───────────────────────────────────────────────────────────┐   │
│     │ 224 RECEIVE A SELECTION OF THE THUMBNAIL IMAGE REPRESENTATION │
│     │ OF THE FIRST TELEVISION CHANNEL                           │   │
│     └───────────────────────────────────────────────────────────┘   │
│                                  │                                  │
│                                  ▼                                  │
│     ┌───────────────────────────────────────────────────────────┐   │
│     │ 225 REPLACE THE STREAMING VIDEO OF THE SECOND TELEVISION  │   │
│     │ CHANNEL WITH A STREAMING VIDEO ASSOCIATED WITH THE FIRST  │   │
│     │ TELEVISION CHANNEL                                        │   │
│     └───────────────────────────────────────────────────────────┘   │
│                                  │                                  │
│                                  ▼                                  │
│     ┌───────────────────────────────────────────────────────────┐   │
│     │ 226 RENDER AT LEAST ONE TELEVISION CHANNEL ICON REPRESENTING │
│     │ A TELEVISION CHANNEL FOR WHICH A THUMBNAIL IMAGE          │   │
│     │ REPRESENTATION IS AVAILABLE                               │   │
│     └───────────────────────────────────────────────────────────┘   │
│                                  │                                  │
│                                  ▼                                  │
│     ┌───────────────────────────────────────────────────────────┐   │
│     │ 227 RECEIVE A SELECTION, FROM A USER, OF THE AT LEAST ONE │   │
│     │ TELEVISION CHANNEL ICON                                   │   │
│     └───────────────────────────────────────────────────────────┘   │
│                                  │                                  │
│                                  ▼                                  │
│     ┌───────────────────────────────────────────────────────────┐   │
│     │ 228 REPLACE THE THUMBNAIL IMAGE REPRESENTATION OF THE FIRST │ │
│     │ TELEVISION CHANNEL WITH A THUMBNAIL IMAGE REPRESENTATION  │   │
│     │ ASSOCIATED WITH THE AT LEAST ONE TELEVISION CHANNEL ICON  │   │
│     └───────────────────────────────────────────────────────────┘   │
└─────────────────────────────────────────────────────────────────────┘
```

*FIG. 12*

229 RENDER THE THUMBNAIL IMAGE REPRESENTATION ON THE DEVICE, THE THUMBNAIL IMAGE REPRESENTATION TEMPORARILY RENDERED IN PLACE OF THE STREAMING VIDEO

230 IDENTIFY THE TELEVISION CHANNEL ASSOCIATED WITH THE THUMBNAIL IMAGE REPRESENTATION RENDERED ON THE DEVICE

231 OBTAIN A TELEVISION PROGRAM LISTING ASSOCIATED WITH THE TELEVISION CHANNEL, THE TELEVISION PROGRAM LISTING PROVIDING DETAILS OF OTHER STREAMING VIDEOS PROVIDED BY THE TELEVISION CHANNEL, THE OTHER STREAMING VIDEOS PROVIDED AT A FUTURE PERIOD OF TIME

232 RENDER THE TELEVISION PROGRAM LISTING, ON THE DEVICE, ALONG WITH THE THUMBNAIL IMAGE REPRESENTATION

FIG. 13

240 RENDER THE THUMBNAIL IMAGE REPRESENTATION ON THE DEVICE, THE THUMBNAIL IMAGE REPRESENTATION TEMPORARILY RENDERED IN PLACE OF THE STREAMING VIDEO

241 RENDER A FIRST SUBSET OF THUMBNAIL IMAGE REPRESENTATIONS ON THE DEVICE, THE THUMBNAIL IMAGE REPRESENTATIONS ASSOCIATED WITH THE PLURALITY OF STREAMING VIDEOS FROM THE PLURALITY OF PROVIDERS OF TELEVISION CHANNELS

242 RECEIVE NOTIFICATION, FROM A USER, INDICATING THE USER DESIRES TO VIEW A SECOND SUBSET OF THUMBNAIL IMAGE REPRESENTATIONS ON THE DEVICE

243 RENDER THE SECOND SUBSET OF THUMBNAIL IMAGE REPRESENTATIONS ON THE DEVICE

FIG. 15

METHODS AND APPARATUS FOR DELIVERING CONTENT FROM A TELEVISION CHANNEL

BACKGROUND

Many television providers have web sites on which viewers can access previously aired television programs. New technologies allow users, via computerized devices (i.e., cell phones, Personal Digital Assistants (PDAs), laptops, etc), to view television programs (that are currently being aired by television channel providers) as if those viewers were watching those television programs on their television set at home. For example, a user with a mobile phone may watch a live sports event, broadcast by a television channel provider, from any location where the mobile phone can access communication. Streaming video of the television show is accessed from the television channel providers, and downloaded onto the computerized device.

Some computerized devices provide additional features similar to those of a television, such as the ability to switch channels, allowing the user to 'channel surf' while watching television programs on a computerized device. As each channel is accessed, the user downloads the currently airing television program onto the computerized device for viewing. Thus, a user with a mobile phone can channel surf to see what television programs are currently airing on TV, and select a preferred television program for viewing.

Other additional features of a television provided by computerized devices include 'picture in picture' viewing. This allows a user to watch streaming video of one television program, while streaming video of a second television program is simultaneously broadcast on the computerized device screen, in a reduced size. Thus, both television programs are downloaded to the computerized device. The user is able to view the content of other television channels without missing any of the television program the user is currently viewing on the computerized device.

SUMMARY

Conventional computerized technologies for delivering content of a television channel (i.e., television programs) suffer from a variety of deficiencies. In particular, conventional technologies for delivering content of a television channel are limited in that conventional technologies inefficiently provide content during television channel switching and 'picture in picture' viewing. During television channel switching, the content of each television channel is downloaded and buffered on the computerized device. If the user chooses to 'channel surf', the user must wait several seconds for the content to download and buffer each time the user switches to a different television channel. The user is also delayed during 'picture in picture' viewing for the same reasons. As the user is viewing television programs available on other television channels (i.e., the television program that is shown, in reduced size, simultaneously with the television program the user is currently watching), a delay exists as those television programs are downloaded and buffered. Additionally, it may be difficult to render two video streams simultaneously for a variety of reasons. The CPU on the computerized device may not be fast enough to download two live streaming videos. The network channel might not be fast enough to download two streaming videos. Also, if a computerized device, such as a mobile phone, uses an antenna to receive broadcasted TV signals, then the mobile phone cannot receive two signals from two different TV channels simultaneously because of TV chip limitations.

Embodiments disclosed herein significantly overcome such deficiencies and provide a system that includes a computer system and/or software executing a television channel content delivering process that captures a thumbnail image representation of the television program currently airing on a television channel, and displays that thumbnail image representation to a user. Thus, instead of downloading and buffering the streaming videos from each television channel, the television channel content delivering process provides the user with a thumbnail image representation representing the current television program airing on each television channel. As the user switches from channel to channel (via the computerized device), the user can quickly and efficiently see which television programs are available for viewing. The television channel content delivering process updates the thumbnail image representation every few seconds, providing the user with an up to date thumbnail image representation of the television programs currently available. It should be noted that streaming video can include, but is not limited to, broadcast technology such as MediaFlo, DVB-H, DVB-T, DMB, etc.

The television channel content delivering process also efficiently provides 'picture in picture' viewing by providing a thumbnail image representation in place of the reduced size streaming video. In 'picture in picture' viewing, the user watches streaming video from a first television channel provider while viewing reduced sized streaming video of television programs currently available on other television channels. The television channel content delivering process provides a thumbnail image representation in place of the reduced sized streaming video, allowing the user to quickly switch from television channel to television channel. Thus, the user does not have to wait for the streaming video (from the other television channels) to download to the computerized device. The television channel content delivering process also resolves the problem of rendering two video streams simultaneously because only one video stream is rendered while the second video stream is rendered as a thumbnail image representation.

In an example embodiment, the television channel content delivering process identifies the list of television channel providers based on a predetermined list of television channel providers. In another example embodiment, the list of television channel providers is based on those television channels the user has previously viewed. In yet another example embodiment, the list of television channel providers is provided by the user. In still yet another example embodiment, the television channel content delivering process predicts the list of television channel providers based on the television programs previously downloaded, to the computerized device, by the user.

In an example embodiment, the television channel content delivering process updates the thumbnail image representation every few seconds. In one embodiment, the updated thumbnail image representation is pushed, from a thumbnail server, to the computerized device. In another example embodiment, the computerized devices pull the updated thumbnail image representation from the thumbnail server.

Once the thumbnail image representation is transmitted to the computerized device, the user may select that thumbnail image representation, indicating the user wishes to view the television program associated with that thumbnail image representation. The television channel content delivering process receives the selection of the thumbnail image representation (selected by the user), and downloads the appropriate streaming video associated with that television channel.

In an example embodiment, the television channel content delivering process also renders an icon depicting a television channel. The user may select the icon to access the streaming video of the television program associated with that television channel. In an example embodiment, the television channel content delivering process also displays a program listing associated with the television channel, allowing the user to view the television program schedule for that television channel. In yet another embodiment, the television channel content delivering process provides a plurality of television channels icons, allowing the user to cycle through the television channel icons to select a television program for viewing.

Embodiments disclosed herein also include a computer system executing a television channel content delivering process that receives a plurality of streaming videos from a plurality of providers of television channels. Each television channel provider delivers a respective streaming video. The television channel content delivering process creates a thumbnail image representation of the content for each of the streaming videos of each television channel. The television channel content delivering process then transmits the thumbnail image representation to a device capable of rendering the thumbnail image representation, and renders the thumbnail image representation on the device. The thumbnail image is representation temporarily rendered in place of the streaming video.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. The computerized device may access the streaming videos via various wireless communication methods including, but not limited to, Global System for Mobile (GSM), General Packet Radio Service (GPRS), Enhanced Data rates for GSM Evolution (EDGE), Universal Mobile Telecommunications System (UMTS), High-Speed Downlink Packet Access (HSDPA), Wireless Fidelity (WiFi), Code Division Multiple Access (CDMA), and Worldwide Interoperability for Microwave Access (WIMAX).

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Spb Software House of Saint-Petersburg, Russia.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 illustrates a flowchart of a procedure performed by the system of FIG. 1, when the television channel content delivering process receives a plurality of streaming videos from a plurality of providers of television channels, and identifies providers of television channels from which to obtain the plurality of streaming videos, based on a predetermined list of providers of television channels, according to one embodiment disclosed herein.

FIG. 9 illustrates a flowchart of a procedure performed by the system of FIG. 1, when the television channel content delivering process creates a thumbnail image representation of the content for each of the streaming videos of each television channel, according to one embodiment disclosed herein.

FIG. 10 illustrates a flowchart of a procedure performed by the system of FIG. 1, when the television channel content delivering process transmits the thumbnail image representation to a device capable of rendering the thumbnail image representation, according to one embodiment disclosed herein.

FIG. 12 illustrates a flowchart of a procedure performed by the system of FIG. 1, when the television channel content delivering process renders the thumbnail image representation of a first television channel concurrently with streaming video of a second television channel, according to one embodiment disclosed herein.

FIG. 13 illustrates a flowchart of a procedure performed by the system of FIG. 1, when the television channel content delivering process renders the thumbnail image representation on the device, and identifies the television channel associated with the thumbnail image representation rendered on the device, according to one embodiment disclosed herein.

FIG. 15 illustrates a flowchart of a procedure performed by the system of FIG. 1, when the television channel content delivering process renders the thumbnail image representation on the device, and renders a first subset of thumbnail image representations on the device, the thumbnail image representations associated with the plurality of streaming videos from the plurality of providers of television channels, according to one embodiment disclosed herein.

DETAILED DESCRIPTION

Embodiments disclosed herein include a computer system executing a television channel content delivering process that that receives a plurality of streaming videos from a plurality of providers of television channels. Each television channel provider delivers a respective streaming video. The television channel content delivering process creates a thumbnail image representation of the content for each of the streaming videos of each television channel. The television channel content delivering process then transmits the thumbnail image representation to a device capable of rendering the thumbnail image representation, and renders the thumbnail image representation on the device. The thumbnail image is representation temporarily rendered in place of the streaming video.

Figure 1:
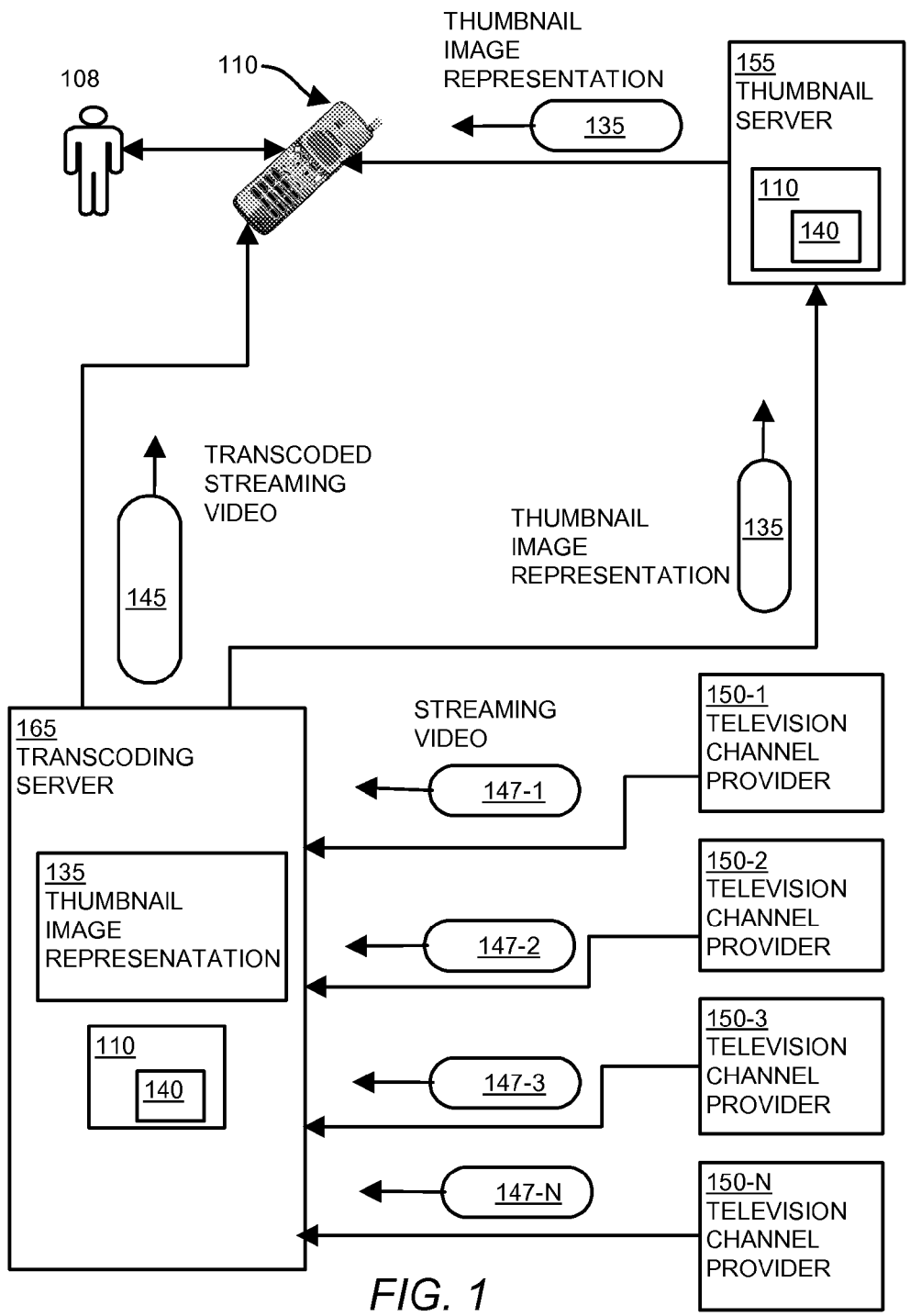
FIG. 1 shows a high-level block diagram of a system according to one embodiment disclosed herein.

FIG. 1 is an example a high-level block diagram of a system according to one embodiment disclosed herein. A user 108 accesses television programs via a computerized device 110, such as a mobile telephone, on which the television channel content delivering process 140-2 is operating. Television channel providers 150-N provide the television programs. A user 108 accesses the television programs by switching to a respective television channel. The television channel providers 150-N provide streaming video 145 to be delivered to the computerized device 110. It should be noted that streaming video can include, but is not limited to, broadcast technology such as MediaFlo, DVB-H, DVB-T, DMB, etc.

When the user 108 accesses a television program via a computerized device 110, such as a mobile telephone, the television channel transmits the streaming video 147-1 to a transcoding server 165. The transcoding server 165 is a computerized device 110 operating the television channel content delivering process 140-2. The television channel content delivering process 140-2 receives the streaming video 147-1, at the transcoding server 165, from the television channel provider 150-1, and generates a thumbnail image representation 135-1. The television channel content delivering process 140-2 transmits the thumbnail image representation 135-1 to a thumbnail server 155. The thumbnail server 155 is also a computerized device 110 operating the television channel content delivering process 140-2. The thumbnail server 155 receives the thumbnail image representation 135-1 from the transcoding server 165, and transmits the thumbnail image representation 135-1 to the computerized device 110 (for example, a mobile telephone, etc.) requesting the television program. When the user 108 selects the thumbnail image representation 135-1, the transcoding server 165 transmits the (now transcoded) streaming video 145 to the computerized device 110 such that the user 108 may view the transcoded streaming video 145 on the computerized device 110 (i.e., a mobile telephone, etc.). In other words, the user 108 is watching the television program on their computerized device 110.

Figure 2:
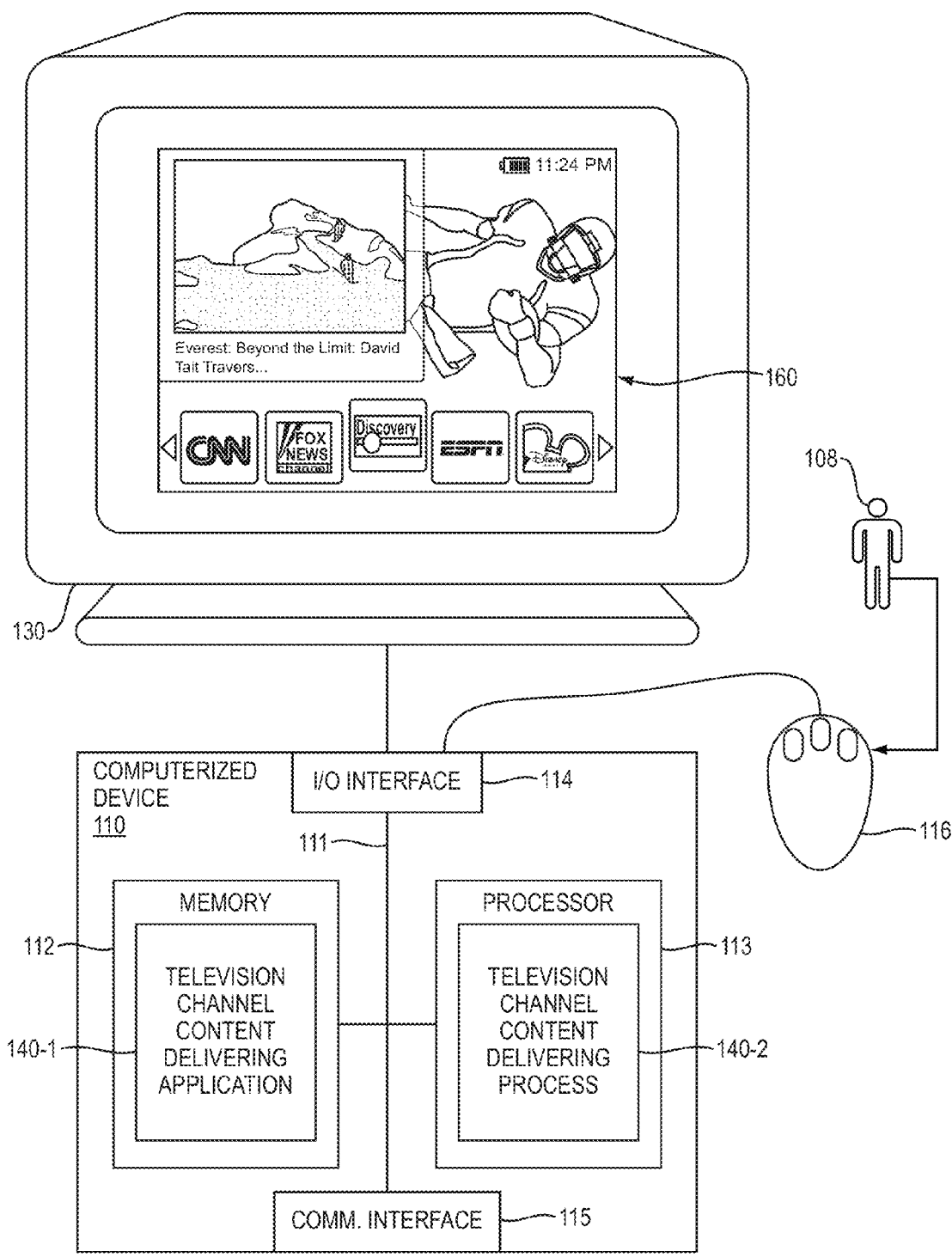
FIG. 2 shows a high-level block diagram of a computer system according to one embodiment disclosed herein.

FIG. 2 is a block diagram illustrating example architecture of a computer system 110 that executes, runs, interprets, operates or otherwise performs a television channel content delivering application 140-1 and television channel content delivering process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the television channel content delivering application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a television channel content delivering application 140-1 as explained herein. The television channel content delivering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a television channel content delivering application 140-1. Execution of a television channel content delivering application 140-1 in this manner produces processing functionality in television channel content delivering process 140-2. In other words, the television channel content delivering process 140-2 represents one or more portions or runtime instances of a television channel content delivering application 140-1 (or the entire a television channel content delivering application 140-1) performing or executing within or upon the processor 113 in the computerized device 110 at runtime.

It is noted that example configurations disclosed herein include the television channel content delivering application 140-1 itself (i.e., in the form of un-executed or non-performing logic instructions and/or data). The television channel content delivering application 140-1 may be stored on a computer readable medium (such as a floppy disk), hard disk, electronic, magnetic, optical, or other computer readable medium. A television channel content delivering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a television channel content delivering application 140-1 in the processor 113 as the television channel content delivering process 140-2. Those skilled in the art will understand that the computer system 110 may include other processes and/or software and hardware components, such as an operating system not shown in this example.

A display 130 need not be coupled directly to computer system 110. For example, the television channel content delivering application 140-1 can be executed on a remotely accessible computerized device via the network interface 115. In this instance, the graphical user interface 160 may be displayed locally to a user 108 of the remote computer, and execution of the processing herein may be client-server based.

Figure 3:
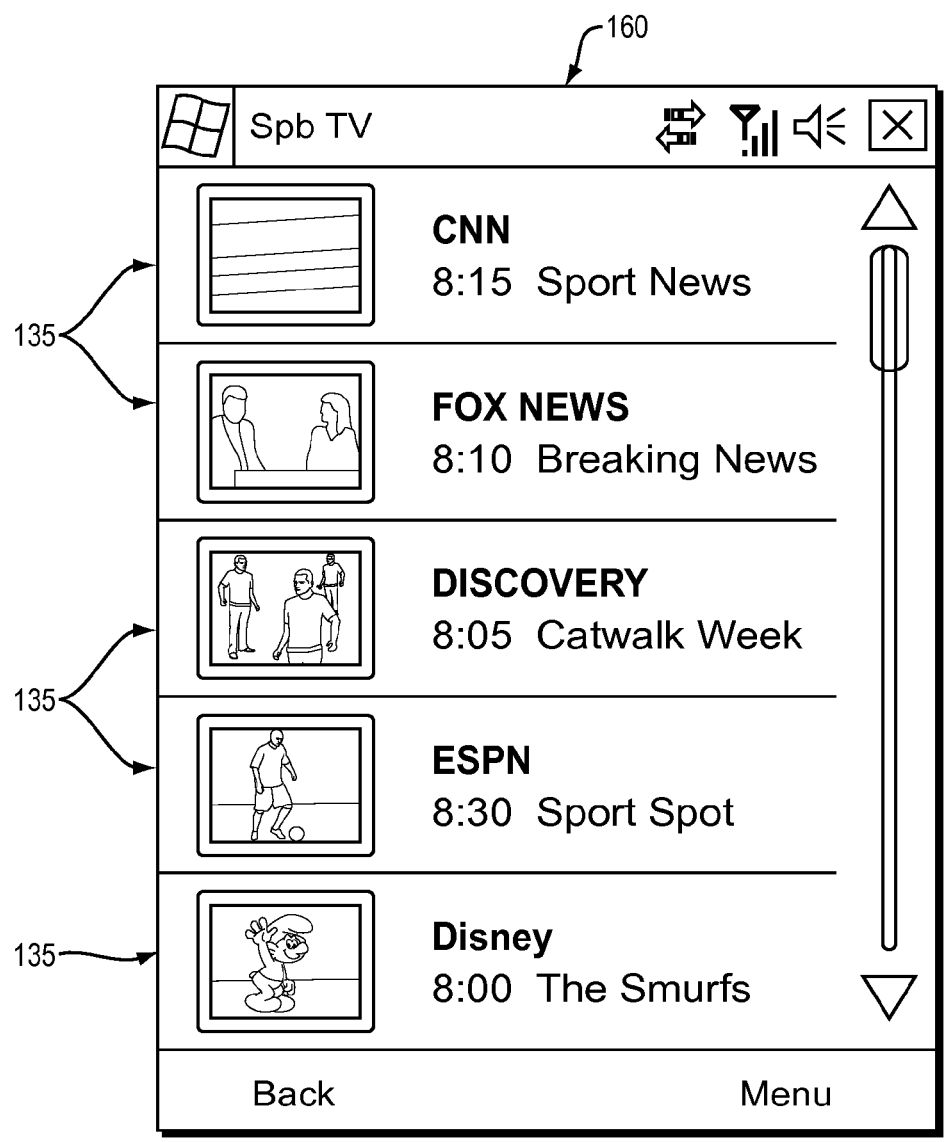
FIG. 3 shows an example screen shot of a computerized device rendering a plurality of thumbnail image representations for a plurality of television channels.

FIG. 3 is an example screen shot of a graphical user interface 160 displaying a plurality of thumbnail image representations 135-N. Alongside each thumbnail image representation 135-1, the television channel content delivering process 140-2 displays the respective television provider 150-1, and the associated television program currently airing by that television provider 150-1. A user 108 may select any of the thumbnail image representations 135-N to view the transcoded streaming video 145 associated with that television program.

Figure 4:
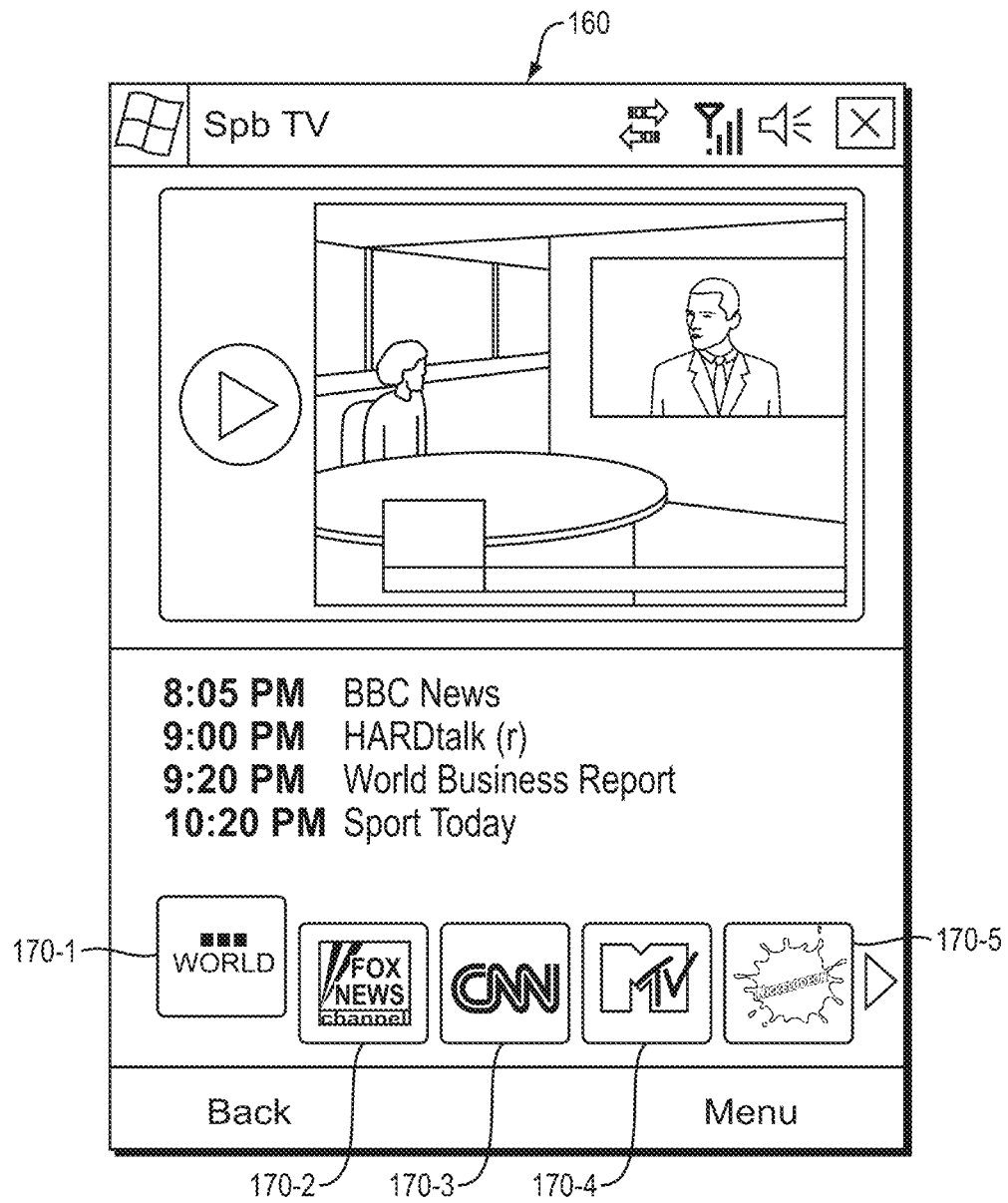
FIG. 4 shows an example screen shot of a computerized device rendering streaming video of a television program along with a plurality of television channel icons.

FIG. 4 is an example screen shot of a graphical user interface 160 displaying transcoded streaming video 145 along with a program listing associated with the television provider 150-1 providing the streaming video 147-1. The graphical user interface 160 also displays a plurality of television channels indicating other television channel providers 150-N providing television programs available for user 108 selection.

Figure 5:
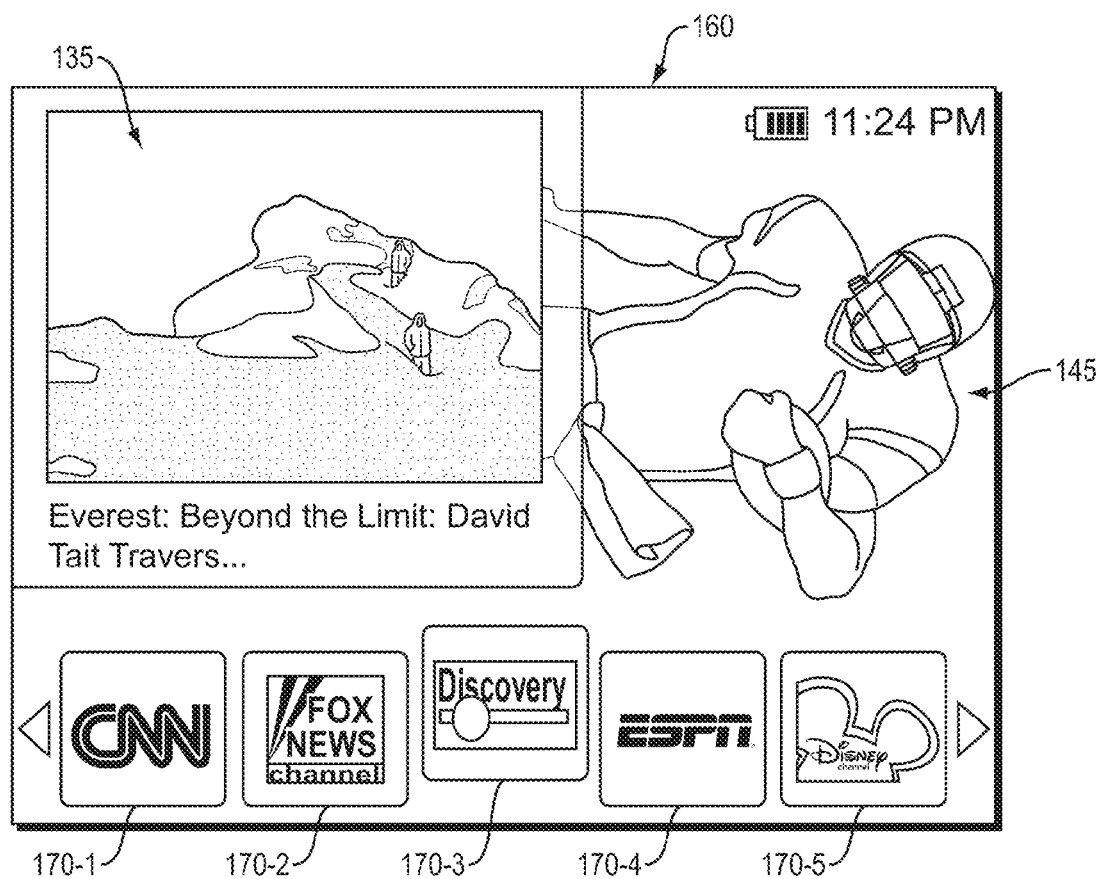
FIG. 5 shows an example screen shot of a computerized device rendering 'picture in picture' viewing.

FIG. 5 is an example screen shot of a graphical user interface 160 displaying a 'picture in picture' view. The graphical user interface 160 displays transcoded streaming video 145 of a first television channel while simultaneously displaying a thumbnail image representation 135-1 associated with a second television channel. The graphical user interface 160 also displays a plurality of television channels icons 170-N representing other television channel providers 150-N available for user 108 selection.

Further details of configurations explained herein will now be provided with respect to a flow chart of processing steps that show the high level operations disclosed herein to perform the television channel content delivering process 140-2.

Figure 6:
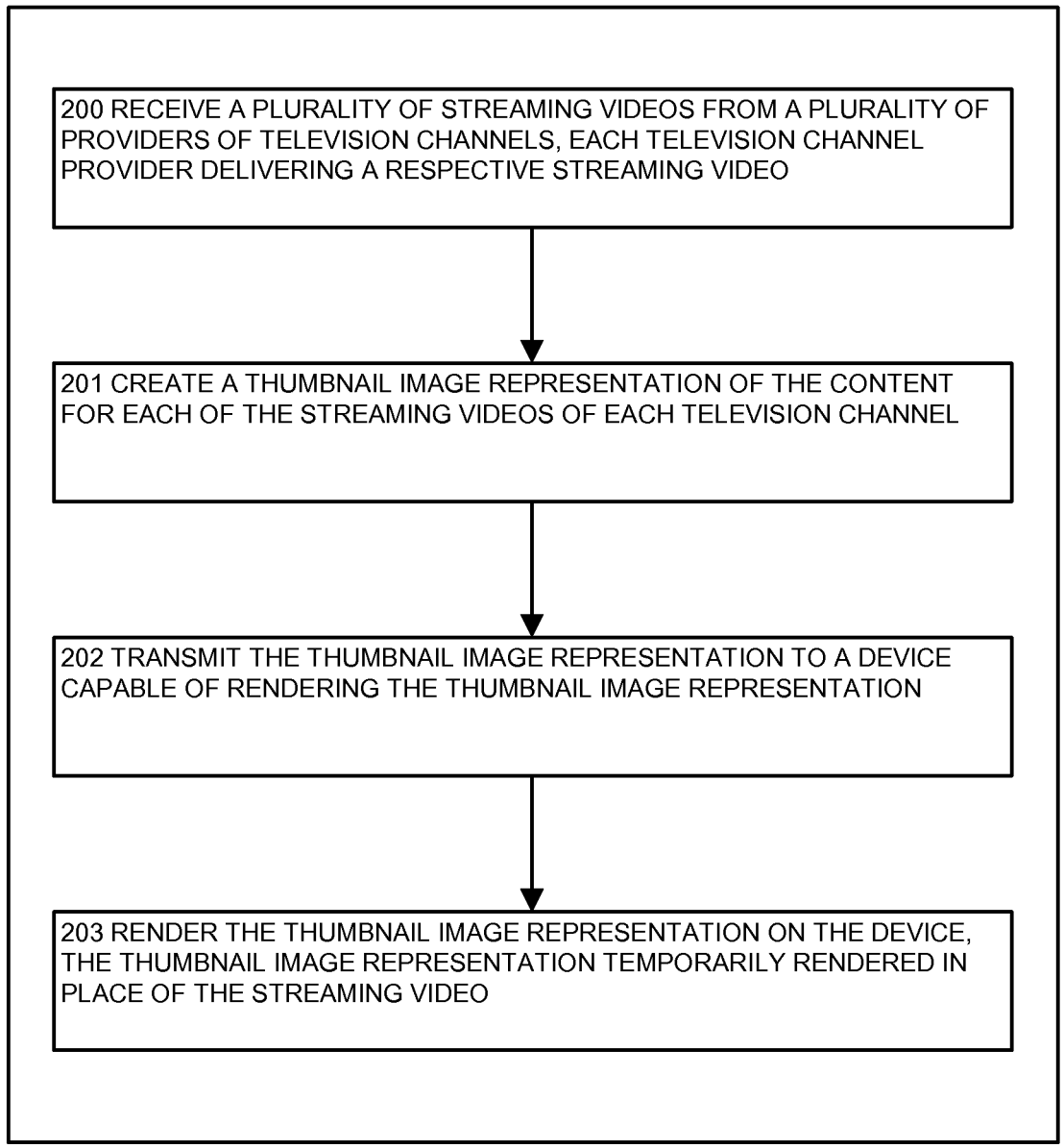
FIG. 6 illustrates a flowchart of a procedure performed by the system of FIG. 1, when the television channel content delivering process receives a plurality of streaming videos from a plurality of providers of television channels, according to one embodiment disclosed herein.

FIG. 6 is an embodiment of the steps performed by television channel content delivering process 140-2 when it receives a plurality of streaming videos 147-N from a plurality of television channels providers 150-N.

In step 200, the television channel content delivering process 140-2 receives a plurality of streaming videos 147-N from a plurality of television channel providers 150-N. Each television channel provider 150-1 delivers a respective streaming video 147-1. In other words, the television provider 150-1 provides the television program as streaming video 147-1 (in the form of transcoded streaming videos 145) to computerized devices 110 such as mobile telephones, laptops, PDAs, etc. The television channel content delivering process 140-2 allows users 108 to access television programs on these devices. When the users 108 attempt to access television programs on their computerized devices 110, the television channel content delivering process 140-2 receives streaming video 147-N from the plurality of television channel providers 150-N.

In step 201, the television channel content delivering process 140-2 creates a thumbnail image representation 135-1 of the content for each of the streaming videos 147-N of each television channel. In an example embodiment, the streaming video 147-1 is transmitted from the television provider 150-1 to a transcoding server 165. The television channel content delivering process 140-2, operating on the transcoding server 165, creates a thumbnail image representation 135-1 of the streaming video 147-1. The thumbnail image representation 135-1 is an image of the content currently airing on the television channel. That image is reduced to thumbnail size for easy viewing on the graphical user interface 160 of the computerized device 110.

In step 202, the television channel content delivering process 140-2 transmits the thumbnail image representation 135-1 to a computerized device 110 capable of rendering the thumbnail image representation 135-1. In an example embodiment, the thumbnail image representation 135-1 is created on the transcoding server 165, and transmitted to a thumbnail server 155. The thumbnail server then transmits the thumbnail image representation 135-1 to the computerized device 110 where the thumbnail image representation 135-1 is rendered on the graphical user interface 160 of the computerized device 110.

In step 203, the television channel content delivering process 140-2 renders the thumbnail image representation 135-1 on the computerized device 110. The thumbnail image representation 135-1 is temporarily rendered in place of the transcoded streaming video 145. In other words, instead of downloading and buffering the transcoded streaming video 145 provided by the television provider 150-1 (via the transcoding server 165), the television channel content delivering process 140-2 transmits the thumbnail image representation 135-1 (representing a snapshot of the content of the streaming video 147-1) to the computerized device 110. Thus, the user 108 does not waste time waiting for the transcoded streaming video 145 to download. The user 108 may easily switch between television channels to quickly view thumbnail image representations 135-N representing content provided by other television channel providers 150-N.

FIG. 7 is an embodiment of the steps performed by television channel content delivering process 140-2 when it receives a plurality of streaming videos 147-N from a plurality of television channel providers 150-N.

In step 204, the television channel content delivering process 140-2 receives a plurality of streaming videos 147-N from a plurality of television channel providers 150-N. Each television channel provider 150-1 delivers a respective streaming video 147-1. In an example embodiment, the television channel content delivering process 140-2 must specify which television channel providers 150-N are to be made available to the user 108.

In step 205, the television channel content delivering process 140-2 identifies television channel providers 150-N from which to obtain the plurality of streaming videos 147-N based on a predetermined list of television channel providers 150-N. In an example embodiment, the list of television channel providers 150-N may be hard coded in the television channel content delivering process 140-2.

Alternatively, in step 206, the television channel content delivering process 140-2 compiles a list of television channel providers 150-N based on previously viewed transcoded streaming videos 145 rendered on a computerized device 110 capable of rendering the thumbnail image representation 135-1. The previously viewed transcoded streaming videos 145 are selected, by a user 108, for rendering on the computerized device 110. In an example embodiment, the list of television channel providers 150-N is compiled based on the transcoded streaming videos 145 previously viewed by the user 108. That is, if the user 108 has viewed "Program 1" provided by "Television Channel Provider 1", then the television channel content delivering process 140-2 adds "Television Provider 1" to the list of television channel providers 150-N that are available to computerized device 110.

Alternatively, in step 207, the television channel content delivering process 140-2 receives a selection, by a user 108, identifying television channel providers 150-N from which to obtain the plurality of streaming videos 147-N. In an example embodiment, the user 108 specifies which television channel providers 150-N the user 108 wishes to access via the computerized device 110. In other words, the user 108 provides a list of television channels the user 108 wishes to access using the computerized device 110.

Figure 8:
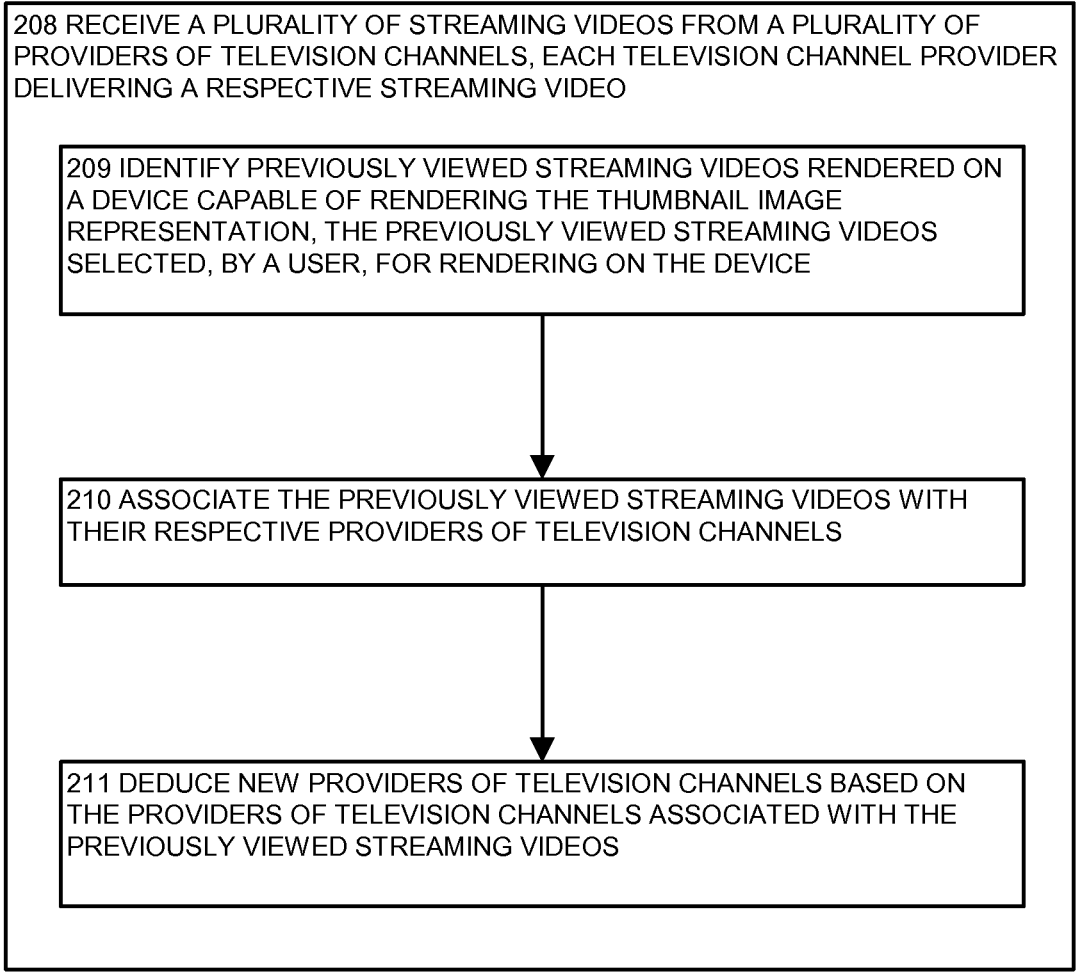
FIG. 8 illustrates a flowchart of a procedure performed by the system of FIG. 1, when the television channel content delivering process receives a plurality of streaming videos from a plurality of providers of television channels, and identifies previously viewed streaming videos rendered on a device capable of rendering the thumbnail image representation, according to one embodiment disclosed herein.

FIG. 8 is an embodiment of the steps performed by television channel content delivering process 140-2 when it receives a plurality of streaming videos 147-N from a plurality of television channel providers 150-N.

In step 208, the television channel content delivering process 140-2 receives a plurality of streaming videos 147-N from a plurality of television channel providers 150-N. Each television channel provider 150-1 delivers a respective streaming video 147-1. In an example embodiment, the list of television channel providers 150-N must be specified for the television channel content delivering process 140-2 to access those television channel providers 150-N via the computerized device 110.

In step 209, the television channel content delivering process 140-2 identifies previously viewed transcoded streaming videos 145 rendered on a computerized device 110 capable of rendering the thumbnail image representation 135-1. The previously viewed transcoded streaming videos 145 are selected, by a user 108, for rendering on the computerized device 110. In other words, the television channel content delivering process 140-2 identifies which television programs the user 108 has selected for viewing in the past.

In step 210, the television channel content delivering process 140-2 associates the previously viewed transcoded streaming videos 145 with their respective television channel providers 150-N. For example, a user 108 views a sports related transcoded streaming video 145 provided by sports network (i.e., a television provider 150-1). The television channel content delivering process 140-2 identifies that the user 108 downloaded the sports related transcoded streaming video 145 and identifies the respective sports network that provided the streaming video 147-1.

In step 211, the television channel content delivering process 140-2 deduces new television channel providers 150-N based on the television provider 150-1 associated with the previously viewed transcoded streaming videos 145. In an example embodiment, the television channel content delivering process 140-2 identifies that the user 108 downloaded the sports related transcoded streaming video 145, and identifies the respective sports network that provided the streaming video 147-1. The television channel content delivering process 140-2 then predicts which other television channel providers 150-N the user 108 may desire to access based on the previously viewed sports related transcoded streaming video 145. For example, the television channel content delivering process 140-2 may predict that the user 108 may desire to access another television provider 150-1 that provides sports related television programs. If the user 108 has viewed sports related transcoded streaming videos 145 provided by "Sports Network 1", the television channel content delivering process 140-2 may deduce that the user 108 may also wish to view transcoded streaming videos 145 provided by "Sports Network 2".

FIG. 9 is an embodiment of the steps performed by television channel content delivering process 140-2 when it creates a thumbnail image representation 135-1 of the content for each of the streaming videos 147-N of each television channel.

In step 212, the television channel content delivering process 140-2 creates a thumbnail image representation 135-1 of the content for each of the streaming videos 147-N of each television channel provider 150-1. The thumbnail image representation 135-1 captures a snapshot of the current content of the television program currently airing on the television channel associated with the television provider 150-1.

In step 213, the television channel content delivering process 140-2 updates the thumbnail image representation 135-1 to capture a current representation of the content of the streaming video 147-1. In an example embodiment, the television channel content delivering process 140-2 updates the thumbnail image representation 135-1 of the streaming video 147-1 every few seconds so as to provide the user 108 with a most current representation of the content of the television program currently airing on the television channel associated with the television provider 150-1. The updated thumbnail image representation 135-1 is transmitted to the graphical user interface 160 of the computerized device 110.

FIG. 10 is an embodiment of the steps performed by television channel content delivering process 140-2 when it transmits the thumbnail image representation 135-1 to a computerized device 110 capable of rendering the thumbnail image representation 135-1.

In step 214, the television channel content delivering process 140-2 transmits the thumbnail image representation 135-1 to a computerized device 110 capable of rendering the thumbnail image representation 135-1. The thumbnail image representation 135-1 is a snapshot of the streaming video 147-1 (i.e., television program) currently airing on a television channel.

In step 215, the television channel content delivering process 140-2 receives notification that an updated thumbnail image representation 135-1 has been created. The updated thumbnail image representation 135-1 captures a current representation of the content of the streaming video 147-1. In an example embodiment, the television channel content delivering process 140-2 creates a new thumbnail image representation 135-1, every few seconds, for each of the television programs that the computerized device 110 is capable of accessing.

In step 216, the television channel content delivering process 140-2 transmits the updated thumbnail image representation 135-1 to the computerized device 110 capable of rendering the thumbnail image representation 135-1. In an example embodiment, the updated thumbnail image representation 135-1 is pushed to the computerized device 110 as each new, updated, thumbnail image representation 135-1 is created.

Alternatively, in step 217, the television channel content delivering process 140-2 receives a request, from the computerized device 110, for the thumbnail image representation 135-1. In an example embodiment, the thumbnail image representation 135-1 is transmitted from a transcoding server 165 to a thumbnail server 155. The television channel content delivering process 140-2, operating on the thumbnail server 155, receives a request, for the thumbnail image representation 135-1, from the computerized device 110.

In step 218, the television channel content delivering process 140-2 transmits the thumbnail image representation 135-1 in response to the request. In an example embodiment, the updated thumbnail image representation 135-1 is pulled from the computerized device 110, as each new thumbnail image representation 135-1 is created.

Figure 11:
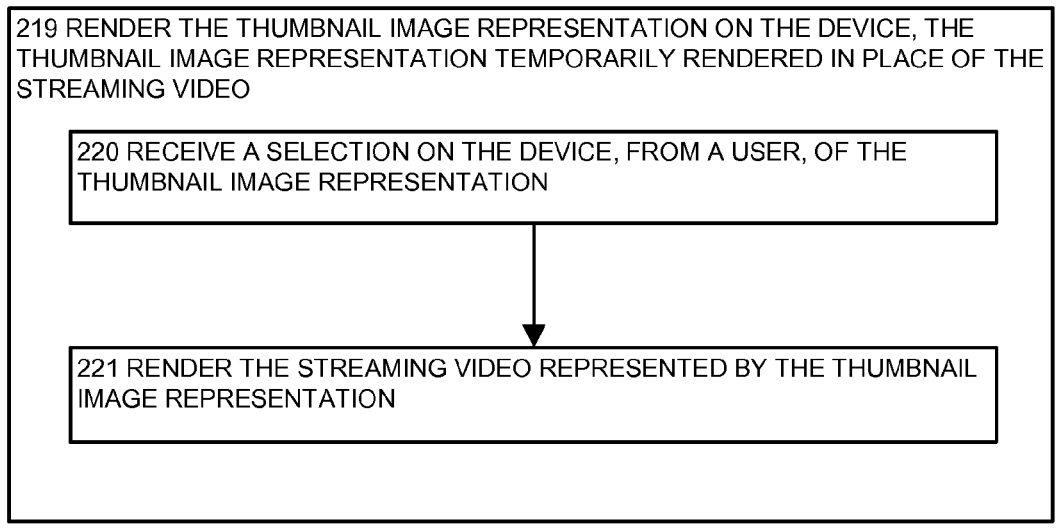
FIG. 11 illustrates a flowchart of a procedure performed by the system of FIG. 1, when the television channel content delivering process renders the thumbnail image representation on the device, the thumbnail image representation temporarily rendered in place of the streaming video, according to one embodiment disclosed herein.

FIG. 11 is an embodiment of the steps performed by television channel content delivering process 140-2 when it renders the thumbnail image representation 135-1 on the computerized device 110.

In step 219, the television channel content delivering process 140-2 renders the thumbnail image representation 135-1 on the computerized device 110. The thumbnail image representation 135-1 is temporarily rendered in place of the transcoded streaming video 145. By rendering the thumbnail image representation 135-1 on the computerized device 110 in place of the transcoded streaming video 145 (represented by the thumbnail image representation 135-1), the user 108 is able to switch television channels quickly to see which television programs are currently available for viewing on the computerized device 110.

In step 220, the television channel content delivering process 140-2 receives a selection on the computerized device 110, from a user 108, of the thumbnail image representation 135-1. In an example embodiment, the television channel content delivering process 140-2 displays the thumbnail image representation 135-1, or a plurality of thumbnail image representations 135-N on the graphical user interface 160 of the computerized device 110, as depicted in FIG. 3. The user 108 may select one of the thumbnail image representations 135-N to access the transcoded streaming video 145 represented by the selected thumbnail image representation 135-1. In other words, the user 108 selects the thumbnail image representation 135-1 to view the television program (associated with the selected thumbnail image representation 135-1).

In step 221, the television channel content delivering process 140-2 renders the transcoded streaming video 145 represented by the thumbnail image representation 135-1. In an example embodiment, a thumbnail image representation 135-1 rendered on the graphical user interface 160 of the computerized device 110 is selected by a user 108, and the transcoded streaming video 145 represented by the thumbnail image representation 135-1 is rendered on the graphical user interface 160 of the computerized device 110, as depicted in FIG. 4.

FIG. 12 is an embodiment of the steps performed by television channel content delivering process 140-2 when it renders the thumbnail image representation 135-1 on the computerized device 110.

In step 222, the television channel content delivering process 140-2 renders the thumbnail image representation 135-1 on the computerized device 110. The thumbnail image representation 135-1 is temporarily rendered in place of the transcoded streaming video 145 so as to reduce the amount of time necessary for a user 108 to view the television programs currently available for viewing (i.e., 'channel surf').

In step 223, the television channel content delivering process 140-2 renders the thumbnail image representation 135-1 of a first television provider 150-1 concurrently with transcoded streaming video 145 of a second television provider 150-1. In an example embodiment, the television channel content delivering process 140-2 provides 'picture in picture' viewing where the user 108 may watch transcoded streaming video 145 from a second television provider 150-2 while viewing a thumbnail image representation 135-1 of a television program currently provided by first television provider 150-1. The 'picture in picture' viewing allows the user 108 to watch a television program while simultaneously seeing which other television programs are available on other television channels. The television channel content delivering process 140-2 provides thumbnail image representations 135-N instead of reduced sized transcoded streaming video 145, allowing the user 108 to quickly view the available television programs.

In step 224, the television channel content delivering process 140-2 receives a selection of the thumbnail image representation 135-1 of the first television provider 150-1. In an example embodiment, the user 108 may select the thumbnail image representation 135-1 rendered on the graphical user interface 160 of the computerized device 110 to indicate that the user 108 wishes to view the television program associated with the selected thumbnail image representation 135-1.

In step 225, the television channel content delivering process 140-2 replaces the transcoded streaming video 145 of the second television provider 150-2 with a transcoded streaming video 145 associated with the first television provider 150-1. In other words, the television channel content delivering process 140-2 renders a thumbnail image representation 135-1 of a first television provider 150-1 along with transcoded streaming video 145 of a second television provider 150-2. The user 108 selects the thumbnail image representation 135-1 to indicate that the user 108 would like to switch the television channel of the computerized device 110 to the television provider 150-1 associated with the thumbnail image representation 135-1. The television channel content delivering process 140-2 then replaces the transcoded streaming video 145 of the second television provider 150-2 with the transcoded streaming video 145 associated with the thumbnail image representation 135-1.

In step 226, the television channel content delivering process 140-2 renders at least one television channel representing a television channel for which a thumbnail image representation 135-1 is available. In an example embodiment, the television channel content delivering process 140-2 renders a plurality of television channels on the graphical user interface 160 of the computerized device 110, as depicted in FIG. 5.

In step 227, the television channel content delivering process 140-2 receives a selection, from a user 108, of at least one television channel. In an example embodiment, the user 108 may select one of the television channels displayed on the graphical user interface 160 of the computerized device 110 indicating that the user 108 wishes to, essentially, 'change the television channel'.

In step 228, the television channel content delivering process 140-2 replaces the thumbnail image representation 135-1 of the first television channel with a thumbnail image representation 135-2 associated with at least one other television channel. In an example embodiment, in response to receiving a selection, of a television channel icon 170-2, from the user 108, the television channel content delivering process 140-2 replaces the currently rendered thumbnail image representation 135-1 with a different thumbnail image representation 135-2 associated with the television channel icon 170-2 selected by the user 108. In other words, the user 108 may continue to view the transcoded streaming video 145, while also viewing thumbnail image representations 135-N representing television programs available for viewing on other television channels. The user 108 may also quickly switch television channels, and view thumbnail image representations 135-N for each respective television channels.

FIG. 13 is an embodiment of the steps performed by television channel content delivering process 140-2 when it renders the thumbnail image representation 135-1 on the computerized device 110.

In step 229, the television channel content delivering process 140-2 renders the thumbnail image representation 135-1 on the computerized device 110. The thumbnail image representation 135-1 is temporarily rendered in place of the transcoded streaming video 145. The thumbnail image representation 135-1 allows a user 108 to quickly view available television programs currently airing without having to wait for each transcoded streaming video 145 (associated with each television programs) to download and buffer.

In step 230, the television channel content delivering process 140-2 identifies the television channel associated with the thumbnail image representation 135-1 rendered on the computerized device 110. In an example embodiment, the television channel content delivering process 140-2 captures a snapshot of a television program currently airing, and associates a respective television channel and television provider 150-1.

In step 231, the television channel content delivering process 140-2 obtains a television program listing associated with the television channel. The television program listing provides details of other streaming videos 147-N provided by the television provider 150-1. The other streaming videos 147-N are provided at a future period of time. In other words, the television channel content delivering process 140-2 obtains the television program listing associated with the television provider 150-1.

In step 232, the television channel content delivering process 140-2 renders the television program listing, on the computerized device 110, along with the thumbnail image representation 135-1. As depicted in FIG. 4, the television channel content delivering process 140-2 renders the program listing on the graphical user interface 160 of the computerized device 110. In an example embodiment, the television channel content delivering process 140-2 renders the program listing along with television channel icons 170-N. In another example embodiment, the television channel content delivering process 140-2 renders the program listing along with a thumbnail image representation 135-1 or a plurality of thumbnail image representations 135-N.

Figure 14:
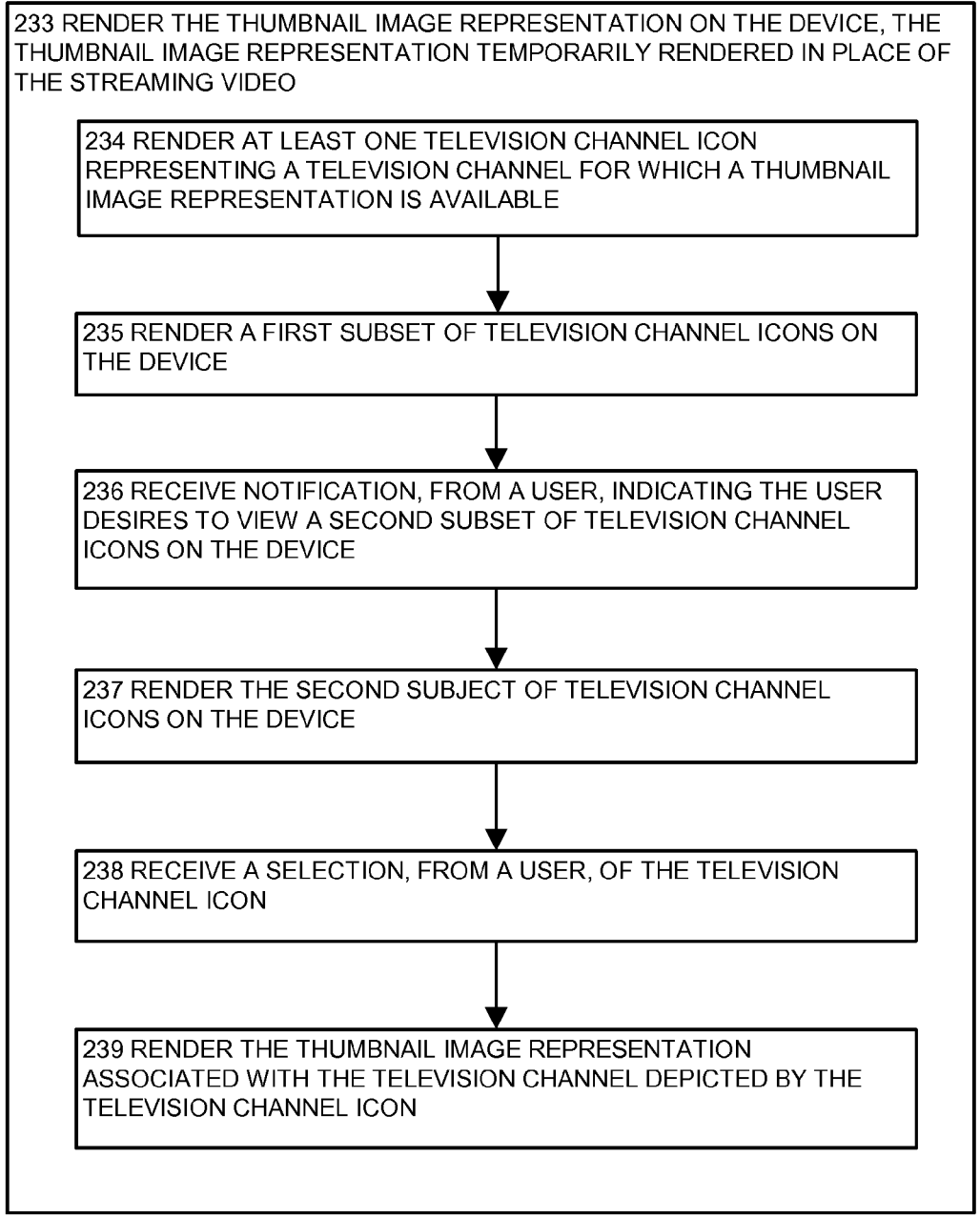
FIG. 14 illustrates a flowchart of a procedure performed by the system of FIG. 1, when the television channel content delivering process renders at least one television channel icon representing a television channel for which a thumbnail image representation is available, according to one embodiment disclosed herein.

FIG. 14 is an embodiment of the steps performed by television channel content delivering process 140-2 when it renders the thumbnail image representation 135-1 on the computerized device 110.

In step 233, the television channel content delivering process 140-2 renders the thumbnail image representation 135-1 on the computerized device 110. The thumbnail image representation 135-1 is temporarily rendered in place of the transcoded streaming video 145. In an example embodiment, the television channel content delivering process 140-2 also renders a program listing or television channel icons 170-N on the graphical user interface 160 of the computerized device 110.

In step 234, the television channel content delivering process 140-2 renders at least one television channel representing a television channel for which a thumbnail image representation 135-1 is available. FIG. 4 depicts an example embodiment where the television channel content delivering process 140-2 renders a plurality of television channel icons 170-N on the graphical user interface 160 of the computerized device 110.

In step 235, the television channel content delivering process 140-2 renders a first subset of television channels on the computerized device 110. In an example embodiment, there may exist more television channel icons 170-N than can fit on the graphical user interface 160 of the computerized device 110. In this case, the television channel content delivering process 140-2 renders (on the graphical user interface 160 of the computerized device 110) only a subset of the available television channel icons 170-N. The television channel content delivering process 140-2 may also render an indication on the graphical user interface 160 (such as an arrow) that more television channel icons 170-N are available for viewing. FIG. 4 shows an example embodiment where there are five television channel icons 170-N rendered on the graphical user interface 160. A small arrow to the right of the fifth television channel icon 170-1 indicates that more television channel icons 170-N are available for viewing.

In step 236, the television channel content delivering process 140-2 receives notification, from a user 108, indicating the user 108 desires to view a second subset of television channels on the computerized device 110. In an example embodiment, the television channel content delivering process 140-2 renders a icon indicating that more television channel icons 170-N are available for viewing, and a user 108 selects that icon, indicating that the user 108 wishes to view more television channel icons 170-N.

In step 237, the television channel content delivering process 140-2 renders the second subject of television channels on the graphical user interface 160 of the computerized device 110. In response to user 108 selection of an icon indicating additional television channels, the television channel content delivering process 140-2 renders a second subset of television channel icons 170-N on the graphical user interface 160 of the computerized device 110.

In step 238, the television channel content delivering process 140-2 receives a selection, from a user 108, of the television channel. In an example embodiment, the user 108 selects a television channel icon 170-1 indicating that the user 108 wishes to view the available content (i.e., transcoded streaming video 145) associated with the television channel represented by the television channel icon 170-1.

In step 239, the television channel content delivering process 140-2 renders the thumbnail image representation 135-1 associated with the television channel depicted by the television channel. In response to a user 108 selecting a television channel icon 170-1, the television channel content delivering process 140-2 renders a thumbnail image representation 135-1 that represents the content available on that television channel associated with the television channel icon 170-1. Thus, the user 108 can 'channel surf' by individually selecting each television channel icon 170-1 rendered on the graphical user interface 160 of the computerized device 110. The user 108 can also select an icon indicating that the user 108 would like to view additional television channel icons 170-N.

FIG. 15 is an embodiment of the steps performed by television channel content delivering process 140-2 when it renders the thumbnail image representation 135-1 on the graphical user interface 160 of the computerized device 110.

In step 240, the television channel content delivering process 140-2 renders the thumbnail image representation 135-1 on the graphical user interface 160 of the computerized device 110. The thumbnail image representation 135-1 is temporarily rendered in place of the transcoded streaming video 145.

In step 241, the television channel content delivering process 140-2 renders a first subset of thumbnail image representations 135-N on the computerized device 110. The thumbnail image representations 135-N are associated with the plurality of streaming videos 147-N from the plurality of television channel providers 150-N. In an example embodiment, the television channel content delivering process 140-2 renders a plurality of thumbnail image representations 135-N on the graphical user interface 160 of the computerized device 110. There may be more thumbnail image representations 135-N available than can fit on the graphical user interface 160 of the computerized device 110. The television channel content delivering process 140-2 then renders only a subset of the available thumbnail image representations 135-N (i.e. as many as can comfortably fit on the graphical user interface 160).

In step 242, the television channel content delivering process 140-2 receives notification, from a user 108, indicating the user 108 desires to view a second subset of thumbnail image representations 135-N on the computerized device 110. When there are more thumbnail image representations 135-N available than can fit on the graphical user interface 160 of the computerized device 110, the television channel content delivering process 140-2 renders only a subset of the thumbnail image representations 135-N, and also renders an icon indicating that there are more thumbnail image representations 135-N available. When a user 108 selects this icon, the television channel content delivering process 140-2 receives notification that the user 108 wishes to view more of the available thumbnail image representations 135-N.

In step 243, the television channel content delivering process 140-2 renders the second subset of thumbnail image representations 135-N on the computerized device 110. In response to user 108 selection of the icon (indicating that there are more thumbnail image representations 135-N available for viewing on the graphical user interface 160 of the computerized device 110), the television channel content delivering process 140-2 renders a second subset of the available thumbnail image representations 135-N. Each thumbnail image representation 135-1 represents a television program currently airing on television.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of delivering content of a television channel, the method comprising:
    receiving, at a transcoding server, a plurality of streaming videos from a plurality of providers of television channels, each television channel provider delivering a respective streaming video;
    creating, at said transcoding server, a thumbnail image representation of the content for each of the streaming videos of each television channel and transmitting said thumbnail image representations to a thumbnail server, the thumbnail image representation updated several times a minute to capture a current representation of the content of the streaming video;
        transmitting, from said thumbnail server, the thumbnail image representation to a mobile device capable of rendering the thumbnail image representation, the thumbnail server and the transcoding server remote from cable television subscriber's home;
    receiving the thumbnail image representation from the transcoding server; and
    rendering the thumbnail image representation on the mobile device, the thumbnail image representation temporarily rendered in place of the streaming video, wherein rendering the thumbnail image representation on the mobile device comprises:
        receiving a selection on the mobile device, from a user, of the thumbnail image representation; and
        rendering the streaming video represented by the thumbnail image representation.

2. The method of claim 1 wherein receiving a plurality of streaming videos from a plurality of providers of television channels comprises:
    identifying providers of television channels from which to obtain the plurality of streaming videos based on a predetermined list of providers of television channels.

3. The method of claim 1 wherein receiving a plurality of streaming videos from a plurality of providers of television channels comprises:
    compiling a list of providers of television channels based on previously viewed streaming videos rendered on a device capable of rendering the thumbnail image representation, the previously viewed streaming videos selected, by a user, for rendering on the device.

4. The method of claim 1 wherein receiving a plurality of streaming videos from a plurality of providers of television channels comprises:
    receiving a selection, by a user, identifying providers of television channels from which to obtain the plurality of streaming videos.

5. The method of claim 1 wherein receiving a plurality of streaming videos from a plurality of providers of television channels comprises:
    identifying previously viewed streaming videos rendered on a device capable of rendering the thumbnail image representation, the previously viewed streaming videos selected, by a user, for rendering on the device;
    associating the previously viewed streaming videos with their respective providers of television channels; and
    deducing new providers of television channels based on the providers of television channels associated with the previously viewed streaming videos.

6. The method of claim 1 wherein transmitting the thumbnail image representation to a device capable of rendering the thumbnail image representation comprises:
    receiving notification that an updated thumbnail image representation has been created, the updated thumbnail image representation capturing a current representation of the content of the streaming video; and
    transmitting the updated thumbnail image representation to the device capable of rendering the thumbnail image representation.

7. The method of claim 1 wherein transmitting the thumbnail image representation to a device capable of rendering the thumbnail image representation comprises:
    receiving a request, from the device, for the thumbnail image representation; and
    transmitting the thumbnail image representation in response to the request.

8. The method of claim 1 wherein rendering the thumbnail image representation on the device comprises:
    rendering the thumbnail image representation of a first television channel concurrently with streaming video of a second television channel.

9. The method of claim 8 further comprising:
    receiving a selection of the thumbnail image representation of the first television channel; and
    replacing the streaming video of the second television channel with a streaming video associated with the first television channel.

10. The method of claim 8 further comprising:
    rendering at least one television channel icon representing a television channel for which a thumbnail image representation is available.

11. The method of claim 10 further comprising:
    receiving a selection, from a user, of the at least one television channel icon; and replacing the thumbnail image representation of the first television channel with a thumbnail image representation associated with the at least one television channel icon.

12. The method of claim 1 wherein rendering the thumbnail image representation on the device comprises:
identifying the television channel associated with the thumbnail image representation rendered on the device;
obtaining a television program listing associated with the television channel, the television program listing providing details of other streaming videos provided by the television channel, the other streaming videos provided at a future period of time; and
rendering the television program listing, on the device, along with the thumbnail image representation.

13. The method of claim 1 wherein rendering the thumbnail image representation on the device comprises:
rendering at least one television channel icon representing a television channel for which a thumbnail image representation is available.

14. The method of claim 13 further comprising:
rendering a first subset of television channel icons on the device;
receiving notification, from a user, indicating the user desires to view a second subset of television channel icons on the device; and
rendering the second subject of television channel icons on the device.

15. The method of claim 13 further comprising:
receiving a selection, from a user, of the television channel icon; and
rendering the thumbnail image representation associated with the television channel depicted by the television channel icon.

16. The method of claim 1 wherein rendering the thumbnail image representation on the device comprises:
rendering a first subset of thumbnail image representations on the device, the thumbnail image representations associated with the plurality of streaming videos from the plurality of providers of television channels;
receiving notification, from a user, indicating the user desires to view a second subset of thumbnail image representations on the device; and
rendering the second subset of thumbnail image representations on the device.

17. The method of claim 1 wherein updating the thumbnail image representation further comprises transmitting a stationary image from the thumbnail server, updating relieving the mobile device from receiving and rendering a streaming image corresponding to the thumbnail image representation.

18. The method of claim 1 wherein displaying the thumbnail image results in the mobile device rendering only a single streaming display at a time.

19. A computerized device comprising:
a memory;
a processor;
a communications interface;
an interconnection mechanism coupling the memory, the processor and the communications interface;
wherein the memory is encoded with television channel content delivering application that when executed on the processor is capable of delivering television channel content on the computerized device by performing the operations of:
receiving, at a transcoding server, a plurality of streaming videos from a plurality of providers of television channels, each television channel provider delivering a respective streaming video;
creating, at said transcoding server, a thumbnail image representation of the content for each of the streaming videos of each television channel and transmitting said thumbnail image representations to a thumbnail server, the thumbnail image representation updated several times a minute to capture a current representation of the content of the streaming video;
transmitting, from said thumbnail server, the thumbnail image representation to a mobile device capable of rendering the thumbnail image representation, the thumbnail server and the transcoding server remote from cable television subscriber's home;
receiving the thumbnail image representation from the transcoding server; and
rendering the thumbnail image representation on the mobile device, the thumbnail image representation temporarily rendered in place of the streaming video.

20. A non-transitory computer readable medium having computer readable code thereon, the medium comprising:
instructions for receiving, at a transcoding server, a plurality of streaming videos from a plurality of providers of television channels, each television channel provider delivering a respective streaming video;
instructions for creating, at said transcoding server, a thumbnail image representation of the content for each of the streaming videos of each television channel and transmitting said thumbnail image representations to a thumbnail server, the thumbnail image representation updated several times a minute to capture a current representation of the content of the streaming video;
instructions for transmitting, from said thumbnail server, the thumbnail image representation to a mobile device capable of rendering the thumbnail image representation, the thumbnail server and the transcoding server remote from the cable television subscriber's home;
receiving the thumbnail image representation from the transcoding server and
instructions for rendering the thumbnail image representation on the mobile device, the thumbnail image representation temporarily rendered in place of the streaming video.

* * * * *